United States Patent [19]

Shelby, Jr.

[11] Patent Number: 5,498,048

[45] Date of Patent: Mar. 12, 1996

[54] CARGO VAN WITH STORAGE AREAS FOR WORK TOOLS, EQUIPMENT AND SUPPLIES

[76] Inventor: Wilbert Shelby, Jr., 709 Emile Ave,, Westwego, La. 70094-4009

[21] Appl. No.: 235,908

[22] Filed: May 2, 1994

[51] Int. Cl.⁶ ................................................. B60P 3/03
[52] U.S. Cl. ........................................ 296/24.1; 296/37.6
[58] Field of Search ......................... 296/37.6, 24.1, 296/37.1; 224/281, 539

[56] References Cited

U.S. PATENT DOCUMENTS

| | | | |
|---|---|---|---|
| 2,192,207 | 3/1940 | Stahl | 296/24.1 X |
| 4,103,956 | 8/1978 | Faulstich | 296/24.1 X |
| 4,247,144 | 1/1981 | Radek | 296/24.1 |
| 4,573,731 | 3/1986 | Knaack et al. | 296/37.6 |
| 4,685,695 | 8/1987 | LeVee | 296/24.1 X |
| 4,705,317 | 11/1987 | Henri | 296/37.6 |
| 4,733,898 | 3/1988 | Williams | 296/37.6 X |
| 4,789,195 | 12/1988 | Fletcher | 296/37.6 |
| 4,830,242 | 5/1989 | Painter | 296/37.6 X |
| 4,917,430 | 4/1990 | Lawrence | 296/37.6 |
| 5,015,025 | 5/1991 | Henriquez | 296/37.6 |

FOREIGN PATENT DOCUMENTS

| | | | |
|---|---|---|---|
| 1255187 | 1/1961 | France | 296/24.1 |
| 1471914 | 3/1967 | France | 296/24.1 |
| 2226346 | 10/1973 | Germany | 296/24.1 |
| 409910 | 6/1946 | Italy | 296/24.1 |
| 929349 | 6/1963 | United Kingdom | 296/24.1 |
| 951351 | 3/1964 | United Kingdom | 296/24.1 |

Primary Examiner—Joseph D. Pape
Attorney, Agent, or Firm—John L. James

[57] ABSTRACT

A cargo van is adapted to provide storage areas for work tools, equipment and supplies. Base members are positioned on the van floor and a platform is positioned on the base member to create a raised floor and define longitudinally extending compartments between the platform and the van floor that are accessible through the rear door. A storage unit has a plurality of drawers and is accessible through the side door. The storage unit is pivotally mounted to rotate sets of drawers into the door opening one set at a time.

16 Claims, 4 Drawing Sheets

U.S. Patent     Mar. 12, 1996     Sheet 1 of 4     5,498,048
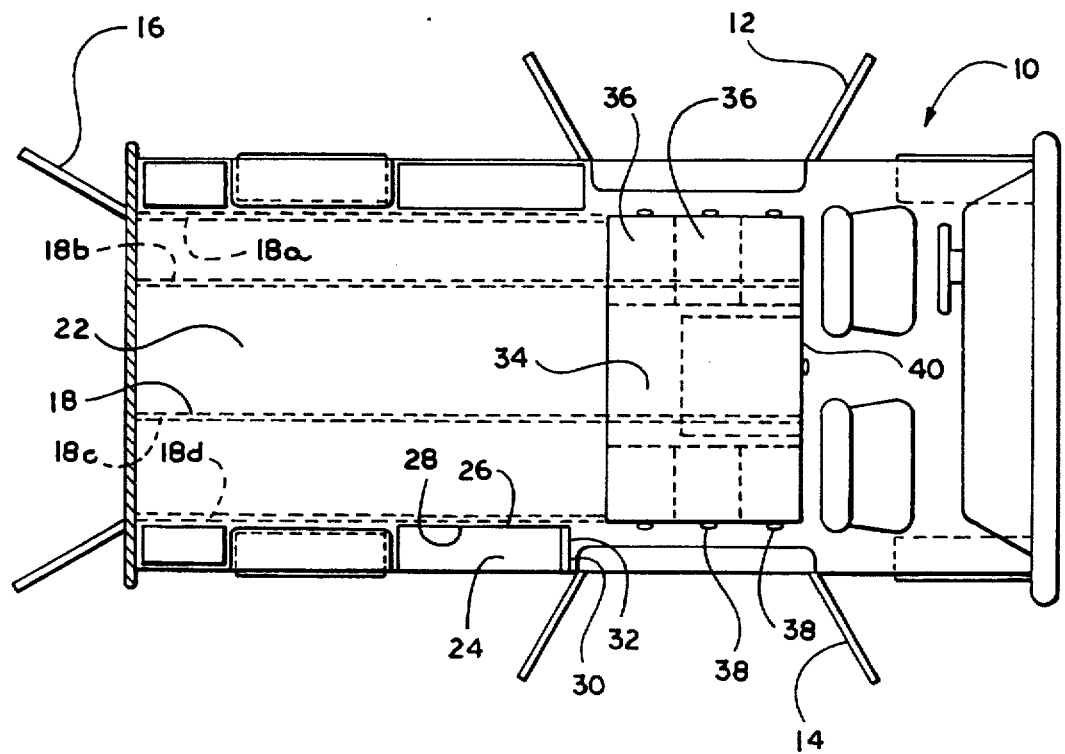
Fig_1
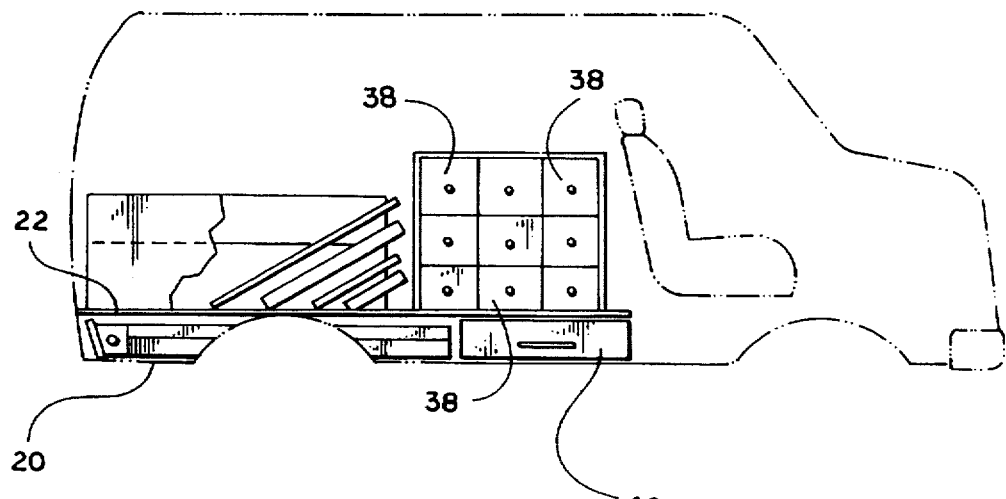
Fig_2

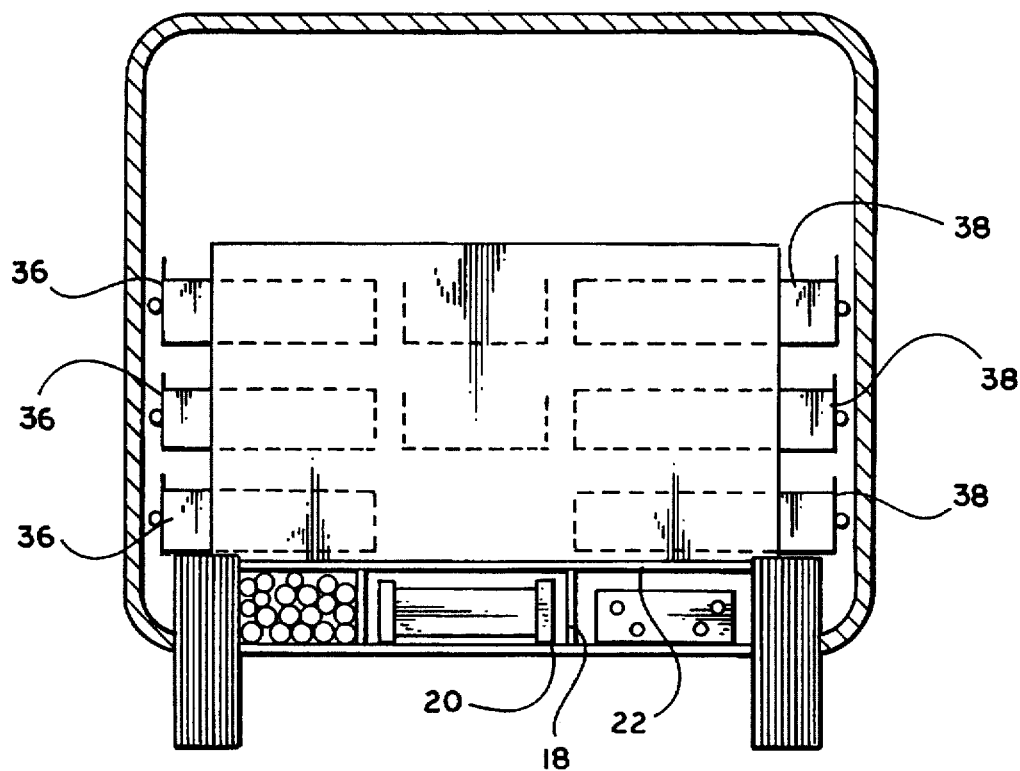
Fig_3
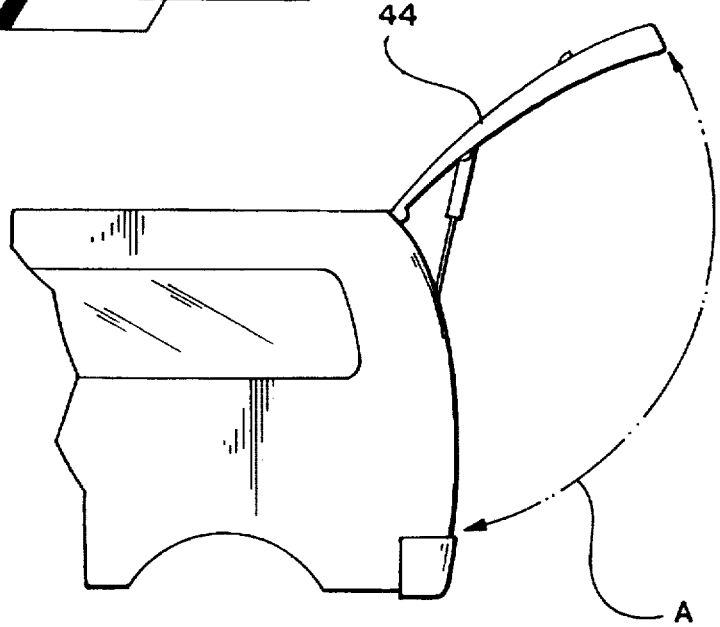
Fig_4

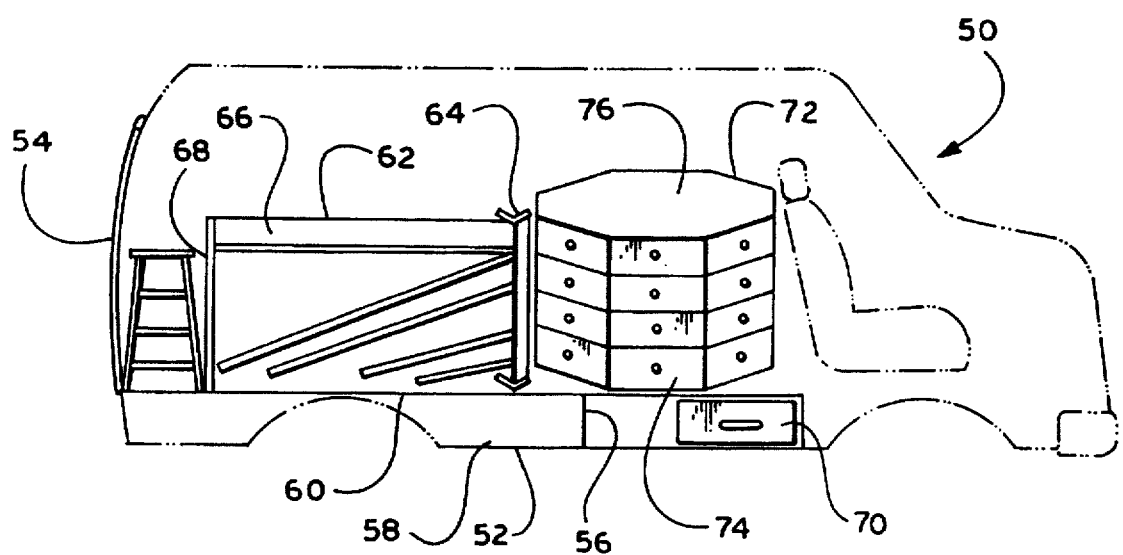
Fig_5
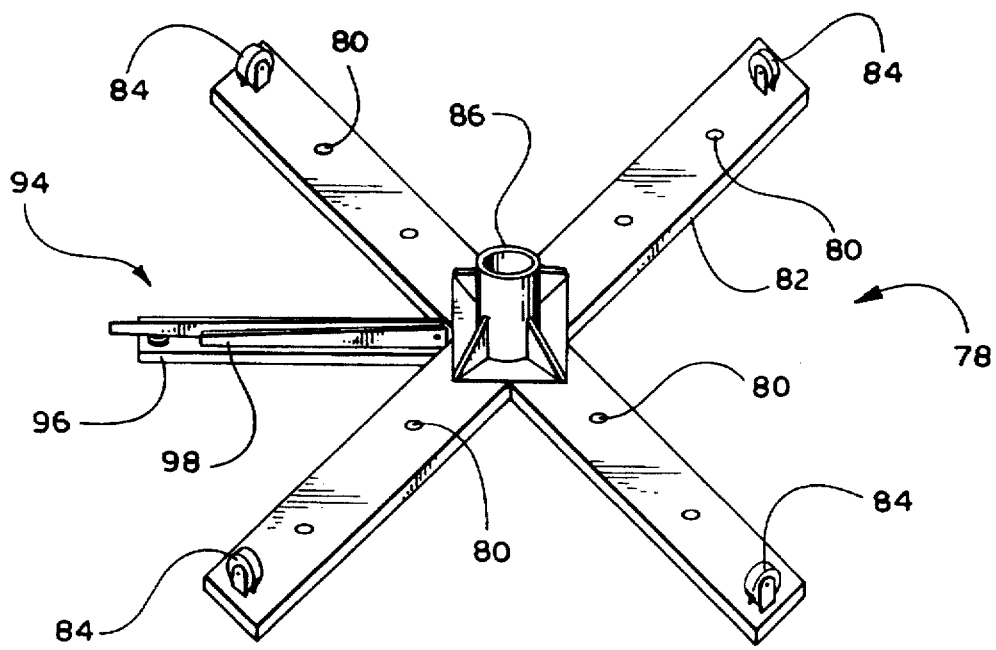
Fig_6

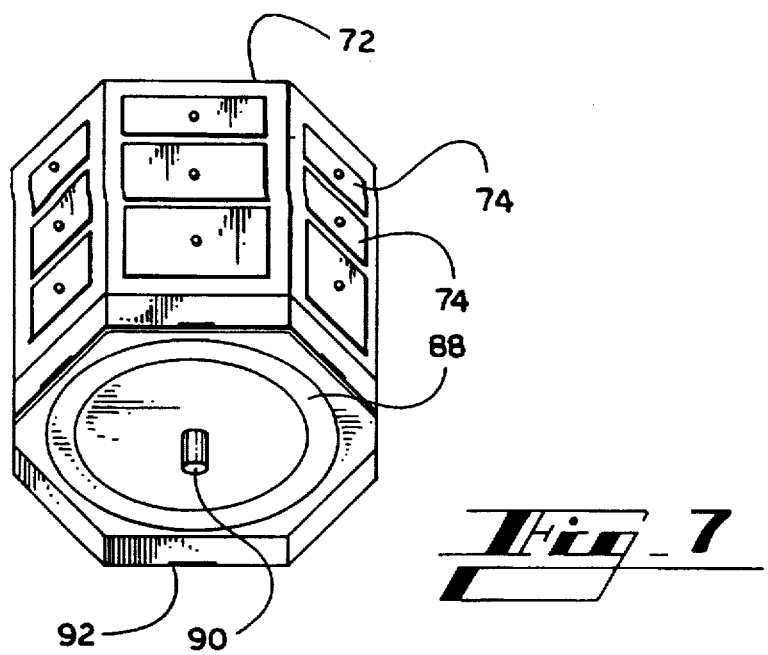
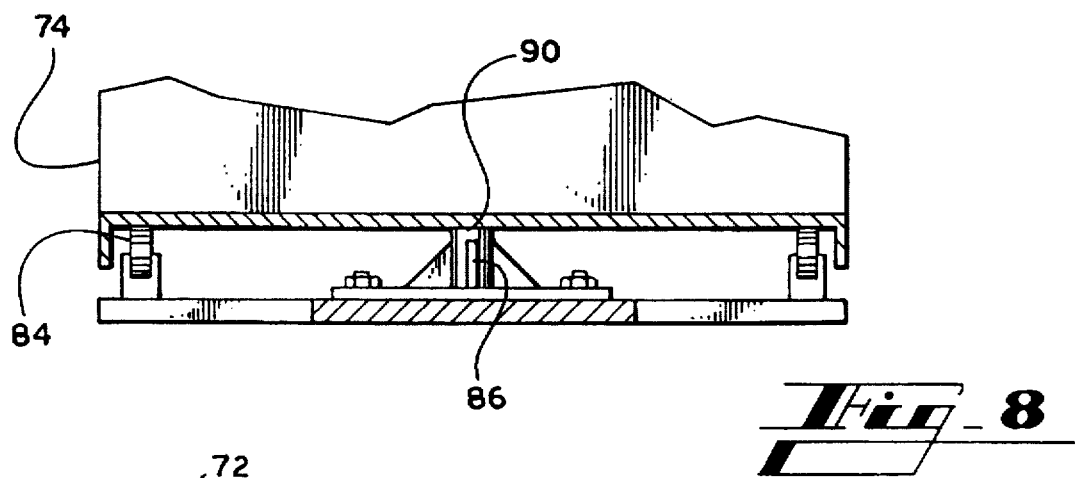
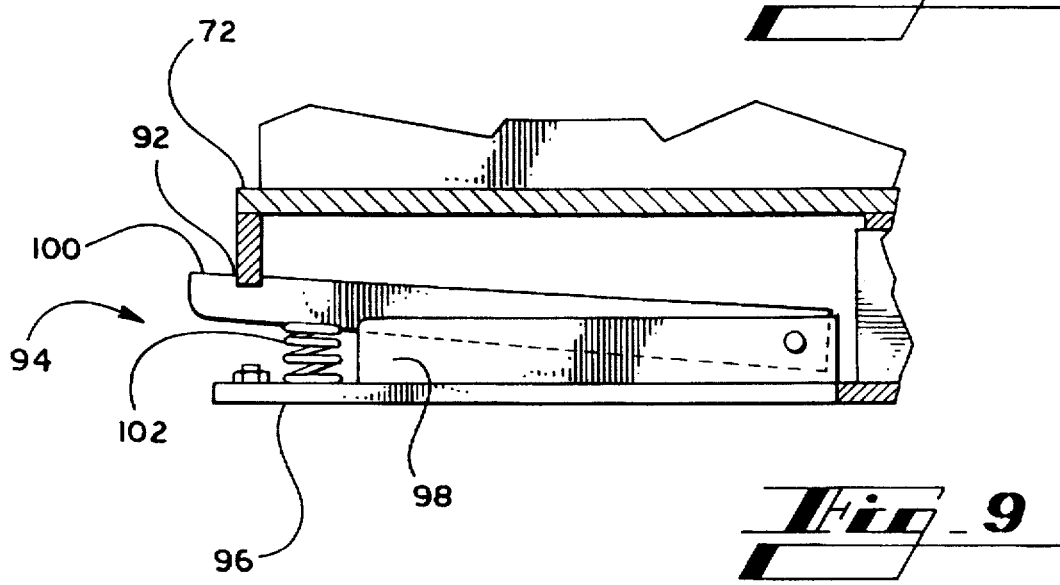

CARGO VAN WITH STORAGE AREAS FOR WORK TOOLS, EQUIPMENT AND SUPPLIES

FIELD OF THE INVENTION

The present invention pertains to a cargo van, and, more particularly, to apparatus for providing a cargo van with storage areas to accommodate work tools, equipment and supplies.

BACKGROUND OF THE INVENTION

Many workers use specialized tools and equipment in performing their daily tasks. Because many job sites are away from the job shop, any tools and equipment needed must be transported to the job site. A worker typically acquires a vehicle large enough to accommodate the tools, equipment and supplies required at the job site. It is common to see a worker transporting ladders on a rack attached to the top of a truck, van or even an automobile, or to see sheets of glass in a special rack attached to the side of a truck or van. These methods are acceptable for some workers, but others, especially electricians, telephone repairers, cable installers, and plumbers must carry an assortment of tools, fasteners, ladders, pipes and other supplies to be adequately prepared to complete a job or service call. Accordingly, it will be appreciated that it would be highly desirable to have a vehicle with storage areas for tools, supplies and equipment so that a worker can efficiently transport the required items to the job site.

Many workers use a cargo van for transporting tools and equipment because the van is large enough to hold what is needed. Shelves and boxes are sometimes installed to more neatly hold some items and to add some degree of organization to what would otherwise junky cargo. While boxes and shelves are useful, they are sometimes inaccessible if they are not near the cargo doors which are located on the vehicle rear and on the passenger side of the vehicle. Sometimes, the gear is accessible, but the passenger side cargo door faces away from the job site requiring extra steps to carry items to the job. Also, with the passenger side cargo door facing away from the job site, it is more difficult to monitor the cargo inside the vehicle. Obviously, a vehicle's direction can always theoretically be changed to reverse the location of the cargo door relative to the job site, but it is not always possible or practical at the job site. It is therefore desirable to have a vehicle with a side cargo door that always faces the job site.

Another problem with cargo vans is the rear doors do not always have room to open to access the cargo at the job site. When another vehicle parks too closely to the van, it is impossible to open the horizontally swinging doors sufficiently to access the cargo. This is especially troublesome for plumbers and electricians who often have ladders, pipes and conduit in the cargo bay. Accordingly, it is desirable to have a vehicle with a rear door that can open in close confinement to provide access to the cargo inside.

SUMMARY OF THE INVENTION

The present invention is directed to overcoming one or more of the problems set forth above. Briefly summarized, according to one aspect of the present invention, a kit is provided for adapting a cargo van to provide storage areas for work tools, equipment and supplies. The van has a floor, rear door, side cargo door and a longitudinally extending axis. The kit comprises at least one base member positionable on the van floor, a platform positionable on the base member to create a raised floor and define longitudinally extending compartments between the platform and the van floor that are accessible through the rear door, a storage unit having a plurality of drawers and being accessible through the side door, and apparatus for mounting the storage unit atop the platform.

Installing the components of the kit converts a basic cargo van into a cargo van specially suited for transporting ladders, pipes, tubes, wire rolls, fasteners, and other equipment, tools and supplies commonly used by electricians, plumbers and other workers. The kit does not require any modification to the van structure; it simply adapts the cargo van interior to a specialized use.

According to another aspect of the invention, a vehicle comprises a floor, a rear door, a passenger side cargo door, a driver side cargo door, at least one base member positioned on the vehicle floor, a platform positioned on the base member creating a raised floor and defining longitudinally extending compartments between the platform and the floor, a storage unit having a plurality of drawers mounted atop the platform, and a storage drawer positioned beneath the platform and the storage unit.

The cargo van is especially suited for transporting ladders, pipes, tubes, wire rolls, fasteners, and other equipment, tools and supplies commonly used by electricians, plumbers and other workers. Because there is a driver side cargo door in addition to a passenger side cargo door, the contents of the cargo bay are easily accessible, and a side cargo door always faces the job site.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is top view of a preferred embodiment of a cargo van according to the present invention with the van top removed revealing the interior.

FIG. 2 is a passenger side elevation view of the van of FIG. 1 with the side removed exposing the interior.

FIG. 3 is rear view of the cargo van of FIG. 1 with the rear doors removed exposing the interior.

FIG. 4 is a side view similar to FIG. 2, but illustrating another preferred embodiment with a single door opening vertically.

FIG. 5 is a side view similar to FIG. 2, but illustrating another preferred embodiment.

FIG. 6 is base, platform for mounting the storage unit of FIG. 5.

FIG. 7 is a perspective view of the storage unit of FIG. 5 illustrating the mounting hardware.

FIG. 8 is a diagrammatic view of the base platform and bottom portion of the storage unit showing their interconnection.

FIG. 9 is diagrammatic view similar to FIG. 8, but illustrating a latching mechanism for the storage unit.

DETAILED DESCRIPTION OF THE PREFERRED EMBODIMENTS

Referring to FIG. 1, a cargo van 10 is illustrated with a driver side cargo door 12, a passenger side cargo door 14 and rear door 16. These doors are two panel doors that swing open to expose the van interior. They are pivotally mounted along one edge portion of a panel so that the door swings horizontally to open.

Referring to FIGS. 1–3, the cargo van 10 is especially equipped for a carpenter, plumber, electrician or other worker by placing one or more base members 18 on the floor 20. There are preferably four of the base members, 18a–d, with a base member 18a extending in the van longitudinally and placed against the left wheel well with another base member 18d placed along the right wheel well. One or more base members 18b–c are then placed intermediate the base members 18a, 18d that are adjacent the wheel wells. This divides the floor area into several elongated sections that extend along the length of the van. The base members 18 may extend to the seating area of the van or they may extend any desired shorter distance. The base members may be constructed of wood or metal or other strong, durable material. The base members need not be fastened to the floor 20 but may be removably attached with an adhesive to facilitate assembly and positioning.

A platform 22 is positioned on the base members 18 to create a raised platform floor above the van floor 20, and to define longitudinally extending compartments between the platform 22 and van floor 20 that are accessible through the rear door 16. The height of the compartments is determined by the height of the base members 18. To accommodate a step ladder or extension ladder, a height of six to twelve inches is preferable. The platform 22 preferably extends between the wheel wells but may be configured to fit about the wheel wells as well, as does the floor 20, depending upon user preference. While the weight of the platform 22 is sufficient to anchor it on the base members 18, it may be secured with fasteners. Removable fasteners are preferred so that the platform 22 and base members 18 can be disassembled and removed when desired.

A wall unit 24 is shown positioned against one sidewall of the van 10. The wall unit 24 may be mounted on the platform 22 or on the van floor 20 when the platform 22 is not contoured to fill the space about the wheel wells. The wall unit 24 preferably has a from panel 26 that covers the wheel well and extends upwardly therefrom. When the van has windows, it is desirable to limit the height of the wall unit 24 to the bottom of the window for aesthetic appeal. If there is no window, the wall unit may extend to the ceiling of the van if desired. Most preferably, the wall unit does not extend to the ceiling to thereby provide room for a box shelf 28 for holding wires, bulbs or other supplies. Such a box shelf is open at the top and has a bottom at a convenient depth based on the intended use. The wall unit 24 extends along the sidewall and is accessible through the side door 14.

FIG. 2 illustrates the wall unit 24 adapted to carry pipes, tubes, pipe benders, pipe threads or other tools and implements with handles. The wall unit 24 has an end panel 30 with openings 32 therein for receiving tool handles. The openings 32 need not extend the entire width of the end panel 30 and it is preferred that the openings 32 are confined to only a portion so that the box shelf 28 can exist side by side with the openings in the width of the wheel well. Other shelves may be added to the wall unit that are accessible from the interior of the van. Alternatively, the front panel 26 may have dowels or hooks installed for hanging wire, hoses and other items.

Referring now to FIGS. 1–3, a storage unit 34 is positioned in the van 10 behind the driver's compartment on the platform 22. The storage unit 34 has a plurality of drawers 36 that are accessible through the passenger side cargo door 14, and a plurality of drawers 38 that are accessible through the driver side cargo door 12. In addition, there may be one or more drawers 40 accessible from the driver's compartment. The storage unit 34 may be constructed of metal, wood, composite material or other material that is strong and durable. The drawers 36, 38, 40 are preferably of a type that must be lifted upward slightly and pulled out to open, and pushed in and then lifted upward slightly to close. Alternatively, the drawers may be equipped with locks or latches to keep the drawers closed when the van is in motion or parked on an incline.

A power tool drawer 42 may be located beneath the storage unit 34 and platform 22 above the floor 20. Such a drawer is useful for storing drills, jig saws, sanders, routers and other hand held power tools that a worker has to carry to a job site. Depending upon the dimensions of the cargo van, there may be room for several tool drawers. The depth that a tool drawer extends into the interior of the van can vary according to the needs of the worker; however, it may be necessary to alter the length of one or more base members to accommodate some drawers. Where a tool drawer is not desired, it is possible to extend the storage unit to the van floor which would shorten the storage compartments formed between the platform 22 and van floor 20.

FIG. 3 illustrates use of the compartments formed between the platform 22 and van floor 20 for storing ladders and pipes. As noted, sometimes on a job site, another vehicle will park close to the cargo van without allowing the rear doors 16 to swing open fully. When that happens, the pipes and ladders are not accessible. A vertically swinging door 44 (FIG. 4) provides a solution to the problem. The door 44 need only open partially to point A to provide access to the pipes and ladders. Depending on how the offending vehicle is parked, the pipes can be removed as well as one of the ladders without the necessity of disturbing other workers. The items m the compartment are completely accessible with the door only partially open to point A.

Referring to FIGS. 5–9, a vehicle, such as a cargo van 50, is adapted to provide storage areas for work tools, equipment and supplies. The cargo van 50 has a floor 52, a rear door 54 and a passenger side cargo door 56. One or more base members 58 are positioned on the floor 52 and extend longitudinally along the length of the van. A platform 60 is positioned on the base members 58 creating a raised platform floor and defining longitudinally extending compartments between the platform 60 and the floor 52 that are accessible through the rear door 54.

A wall unit 62 extends along the sidewall of the van. The wall unit 62 may incorporate an angle iron 64 with a plurality of openings for storing pipes, pipe benders, pipe threaders and similar items of equipment with elongated handles. A box shelf 66 provides a recessed storage area for small reels of cable, wire and other items. In addition to the long sixteen and twenty foot ladders that a worker may normally carry to a job site, sometimes a smaller six foot step ladder is needed. Space is provided in the van along the sidewall at the end of the wall unit 62 for a six foot step ladder by shortening the length of the wall unit so that an end panel 68 is spaced from the rear door 54 providing sufficient space to stand a six foot step ladder upright.

In the area of the side cargo door, a tool drawer 70 is positioned on the floor 52 beneath the platform 60 and is convenient for storing hand held power tools.

Referring to FIGS. 5 and 7, positioned behind the driver's compartment and accessible through the cargo door 56 is a storage unit 72 with a plurality of drawers 74. The top surface 76 is polygonal, preferably octagonal. The drawers 74 are arranged in vertical columns and horizontal layers or rows with each row containing four drawers. Of the four drawers in each row, there are two long drawers and two short drawers to more efficiently use the space in the octagonal arrangement. While other configurations could be used, an octagonal arrangement efficiently utilizes the space and avoids the use of obtrusive corners which can be a nuisance as the storage unit rotates.

Referring now to FIGS. 6–7, the storage unit 72 is pivotally or rotatably mounted to selectively position one vertical column of drawers 74 in the doorway at a time. A mounting bracket 78 is attached to the platform with fasteners such as screws 80 and has a plurality of radially extending arms 82 emanating from a common union of the arms. Each arm has a roller 84 thereon and an upright mounting cup 86 connected to the arms 82 at the common junction of the arms. The mounting cup 86 is fastened to the arms with screws or other fasteners.

A mounting bracket or roller contact surface 88 is fastened to the bottom of the storage unit 72. Where the storage unit will store lightweight items and is constructed of lightweight materials, then the bracket 88 can be a simple ring, and the rollers 84 can be constructed of rubber or a polymeric material. On the other hand, when the storage unit will store heavyweight items or is constructed of heavyweight materials, the bracket 88 should be metallic for riding on metallic rollers 84. A mounting pole 90 is secured to the bottom of the storage unit and extends downwardly for fitting in the cup 86 (FIG. 8). The bottom portion of the cabinet also contains a number of grooves or slots 92 with one slot 92 allotted for each vertical column of drawers 74.

Referring now to FIGS. 6 and 9, a latching mechanism 94 is provided for preventing the storage unit 72 from pivoting so that a desired column of drawers 74 may be positioned at the doorway for easy access. The latching mechanism 94 includes an arm 96 extending radially from the common union of arms. A brace 98 is fastened to the arm 96 and extends along the arm 96. A latching lever 100 is pivotally connected to the brace 98 and is movable into engagement with the storage unit at one of the slots 92. When so engaged, the storage unit is prevented from rotating. The latching lever 100 is biased towards engagement with the slot 92 by a spring, such as coil spring 102.

It can now be appreciated that there has been presented a cargo van adapted to provide storage areas for work tools, equipment and supplies. The van has a floor, a rear door, a side door, and at least one base member positioned on said vehicle floor. A platform is positioned on the base member creating a raised platform floor and defining longitudinally extending compartments between the platform and floor that are accessible through the rear door. A storage unit has a plurality of drawers accessible through the side door, and is mounted atop the platform. A tool drawer is located beneath the platform and storage unit and is also accessible via the side door. For additional storage a wall unit is mounted on the platform.

While the invention has been described with reference to the preferred embodiments, it will be understood by those skilled in the art that various changes may be made and equivalents may be substituted for elements of the preferred embodiments without departing from invention. In addition, many modifications may be made to adapt a particular situation and material to a teaching of the invention without departing from the essential teachings of the present invention.

It can also be appreciated that there has been described a kit for adapting a cargo van having a floor, rear door and side door to provide storage areas for work tools, equipment and supplies. The kit includes at least one base member positionable on the van floor, a platform positionable on the base member to create a raised floor and define longitudinally extending compartments between the platform and the van floor that are accessible through the rear door, a storage unit having a plurality of drawers and being accessible through the side door, and means for mounting the storage unit atop the platform. The storage unit has first and second sets of drawers and is pivotally mounted to selectively position the first and second sets of drawers at the side door one set at a time. A latching mechanism is provided for restraining the storage unit from pivoting. A storage drawer positionable beneath the platform and the storage unit and accessible through the side door for storing power hand tools.

The means for mounting the storage unit includes a first mounting bracket attachable to the platform with a plurality of arms extending from a common intersection with each arm having a roller thereon, an upright cup extending from the common intersection, a second mounting bracket attachable to a bottom portion of the storage unit for riding on the rollers, and a mounting pole attachable to the bottom portion of the storage unit and extendible downward therefrom to fill the cup.

The kit also includes wall unit mountable on the platform. When mounted, the wall unit extends along a sidewall and has an end portion with openings. It can be mounted on the platform to conceal a wheel well area of the van may have a recessed top forming a shelf.

As is evident from the foregoing description, certain aspects of the invention are not limited to the particular details of the examples illustrated. It is therefore contemplated that other modifications and applications will occur to those skilled in the art. It is accordingly intended that the claims shall cover all such modifications and applications as do not depart from the true spirit and scope of the invention.

What is claimed is:

1. A kit for adapting a cargo van to provide storage areas for work tools, equipment and supplies, said cargo van having a floor, rear door, side door, and left and right wheel wells with top portions protruding above said floor, the kit comprising:

at least one base member positionable on the van floor between said wheel wells;

a platform positionable on the base member to create a raised floor above said van floor at a lower elevation than said top portions of said wheel wells and define longitudinally extending compartments between said platform and said van floor that are accessible through said rear door;

a storage unit having a plurality of drawers and being accessible through said side door; and means for mounting said storage unit atop said platform.

2. A kit, as set forth in claim 1, including a storage drawer positionable beneath said platform and said storage unit and accessible through said side door.

3. A kit, as set forth in claim 1, including a wall unit mountable on said platform.

4. A kit, as set forth in claim 3, wherein said wall unit extends longitudinally and has an end portion with openings.

5. A kit, as set forth in claim 3, wherein said wall unit extends longitudinally and mounts on said platform to conceal one of said left and right wheel wells.

6. A kit, as set forth in claim 3, wherein said wall unit extends longitudinally and has a recessed top forming a shelf.

7. A vehicle adapted to provide storage areas for work tools, equipment and supplies, said vehicle having a cargo bay with a floor, rear door and a side door, said vehicle comprising:

at least one base member positioned on said vehicle floor;

a platform positioned on said base member creating a raised platform floor and defining longitudinally extending compartments between said platform and said vehicle floor that are accessible through said rear door;

a storage unit having a plurality of drawers and being mounted in said cargo bay and accessible through said side door; and means for mounting said storage unit atop said platform.

8. A vehicle, as set forth in claim 7, including a storage drawer positioned beneath said platform and said storage unit in said cargo bay and accessible through said side door.

9. A vehicle, as set forth in claim 7, including a wall unit mounted on said platform.

10. A vehicle, as set forth in claim 9, wherein said wall unit extends longitudinally and has an end portion with openings to receive elongated members therein, and wherein said wall unit extends longitudinally and has a recessed top forming a shelf.

11. A vehicle, as set forth in claim 9, wherein said wall unit extends longitudinally along a sidewall of the vehicle and mounts on said platform concealing a wheel well area of the vehicle.

12. A vehicle, as set forth in claim 7, wherein said storage unit has first and second sets of drawers and is pivotally mounted to selectively position said first and second sets of drawers at said side door one set at a time.

13. A vehicle, as set forth in claim 12, including a latch for restraining said storage unit from pivoting.

14. A vehicle, as set forth in claim 7, wherein said means for mounting said storage unit includes:

a first mounting bracket attached to said platform and having a plurality of arms extending from a common intersection with each arm having a roller thereon, and an upright cup extending from said common intersection;

a second mounting bracket attached to a bottom portion of said storage unit and riding on said rollers; and a mounting pole attached to said bottom portion of said storage unit and extending downward therefrom to fill said cup.

15. A vehicle, as set forth in claim 14, wherein said bottom portion has a number of slots, and including:

a locking arm extending from said common intersection;

a finger pivotally connected to said locking arm; and a spring urging; said finger into locking engagement with one of said slots to prevent said storage unit from pivoting.

16. A vehicle comprising:

a floor;

a cargo bay;

a rear door accessing said cargo bay;

a passenger side cargo door opening outwardly from said cargo bay;

a driver side cargo door opening outwardly from said cargo bay;

at least one base member positioned on said vehicle floor;

a platform positioned on said base member creating a raised floor and defining longitudinally extending compartments between said platform and said floor;

a storage unit having a plurality of drawers mounted atop said platform and accessible through said passenger and driver side cargo doors; and a storage drawer positioned beneath said platform and said storage unit.

* * * * *